(12) United States Patent
Murali et al.

(10) Patent No.: US 7,593,378 B1
(45) Date of Patent: Sep. 22, 2009

(54) SINR-BASED POWERDOWN APPARATUS AND METHOD FOR A WIRELESS COMMUNICATIONS SYSTEMS

(75) Inventors: Partha Sarathy Murali, Hyderabad (IN); Chandra Sekhar Ponnamanda Venkata, Hyderabad (IN); Dharani Naga Sailaja Sankabathula, Vijayawada (IN); Satya Rao, Hyderabad (IN)

(73) Assignee: Redpine Signals, Inc., San Jose, CA (US)

(*) Notice: Subject to any disclaimer, the term of this patent is extended or adjusted under 35 U.S.C. 154(b) by 548 days.

(21) Appl. No.: 11/453,655

(22) Filed: Jun. 15, 2006

(51) Int. Cl.
*H04W 4/00* (2006.01)

(52) U.S. Cl. .................. 370/338; 370/210; 455/574

(58) Field of Classification Search ................ None
See application file for complete search history.

(56) References Cited

U.S. PATENT DOCUMENTS

2004/0100898 A1* 5/2004 Anim-Appiah et al. ..... 370/210

* cited by examiner

*Primary Examiner*—Erika A Gary
(74) *Attorney, Agent, or Firm*—File-EE-Patents.com; Jay A. Chesavage

(57) ABSTRACT

During the preamble interval of a wireless packet, a receiver estimates the SINR of the preamble, and also examines the packet header to determine the data rate, length, and destination address. If the SINR as determined from the preamble is below a threshold, or if the SINR combined with the data rate from the packet header is below a threshold, the receiver is powered down for the duration of the current packet. Additionally, if the packet header bears a destination address for a different station from the one receiving it, the receiver is powered down for the duration of the packet. In this manner, the receiver power is only used to receive packets that have sufficient SINR to be correctly received for their data rate, or are destined for the present station. The reduction in power consumption results in longer battery life for the station.

20 Claims, 11 Drawing Sheets

IEEE 802.11 OFDM Receiver
Prior Art

Preamble Stream
Prior Art

Packet Detection & Coarse Frequency Offset
Prior Art

Packet Detection
Prior Art

Noise Estimator

L=16 for short preamble
L=64 for long preamble

2L Sample Accumulator

L Sample Accumulator

Wireless Data Stream
Prior Art

OFDM Receiver
Prior Art

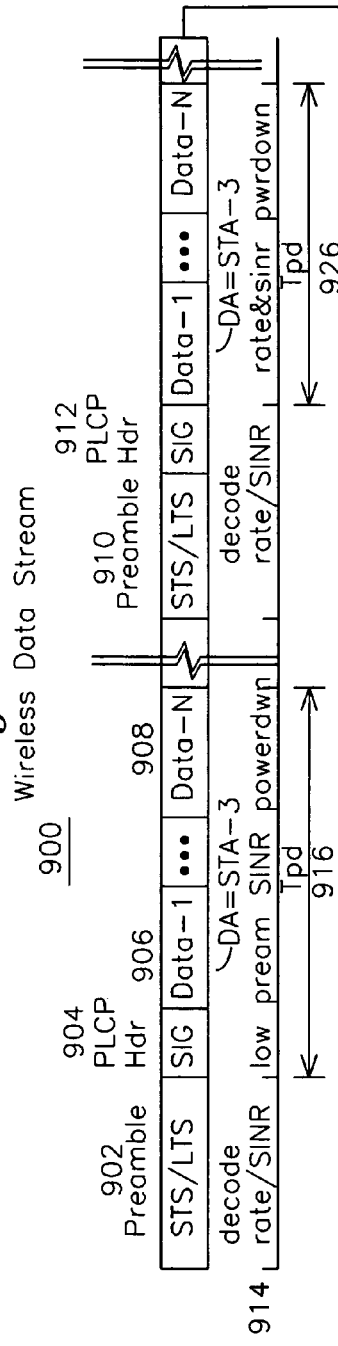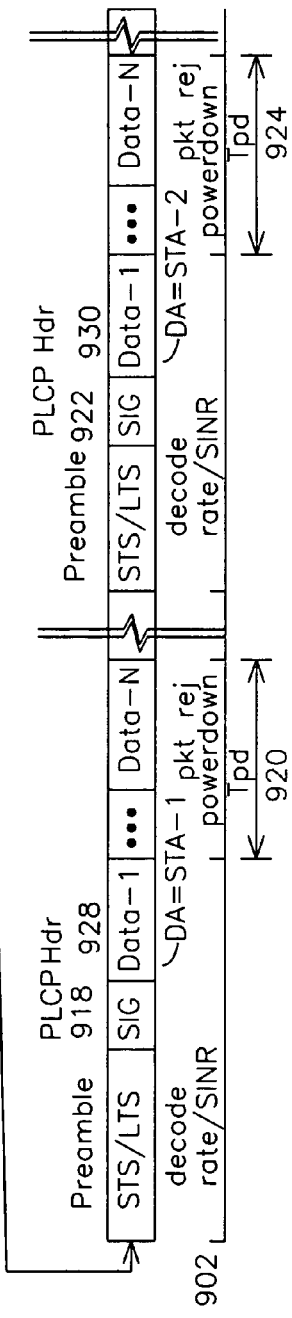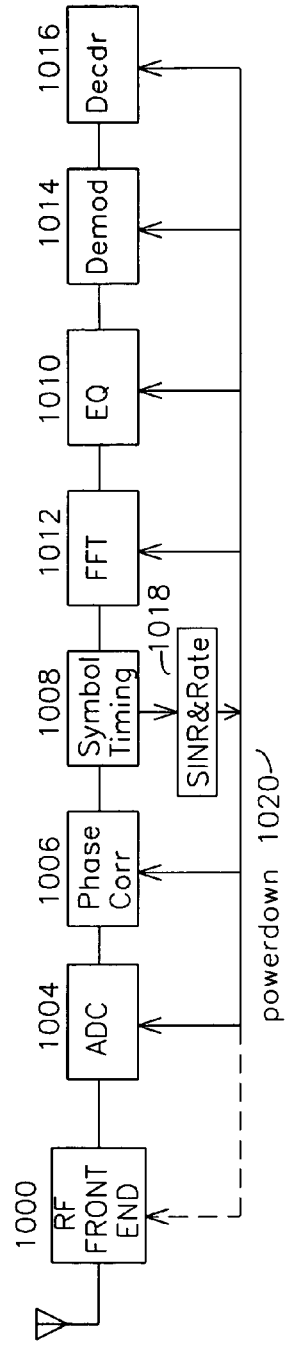
Figure 9
Figure 10
SINR-dependant Powersave OFDM Receiver

SINR-BASED POWERDOWN APPARATUS AND METHOD FOR A WIRELESS COMMUNICATIONS SYSTEMS

FIELD OF THE INVENTION

The present invention is directed to the field of wireless communication equipment, particularly battery-operated equipment operating in varying SINR (signal plus interference to noise ratio) conditions.

BACKGROUND OF THE INVENTION

FIG. 1 shows a prior art OFDM receiver 10. A baseband signal 12 enters a synchronization function 14, which serves to identify phase and frequency offsets in the incoming signal 12, where they are fed back to an NCO (not shown) or a phase rotator (not shown) which removes the offsets and frequency drifts from the synchronized signal. The phase and frequency corrected signal 15 is delivered to an FFT 16 which recovers the combinations of OFDM subcarriers which comprise the transmitted data. FFT outputs 17 are shown as signal 17a, comprising linear combinations of FFT output data having real and imaginary components. The FFT output 17 is provided to a channel estimation and equalization function 18, which produces output 19 compensated for channel phase and magnitude variations. Plot 19a shows the output 19 in a frequency vs real and imaginary amplitude view, and plot 19b shows the corresponding constellation diagram for 16-QAM, where each position in a 16 QAM constellation diagram represents 4 bits of data after decoding. The output 19 of the channel compensator 18 is fed to the soft constellation demapper 24, which performs the function of converting the constellation into corresponding data values, and this output 23 is fed to the de-interleaver and soft decoder 20, which performs data decoding resulting in output data 22.

FIG. 2 shows a preamble stream 25 for an OFDM packet. The packet 25 comprises a sequence of preamble tones P0 through P15 which form a first preamble 26 followed by a second identical preamble 28, which is followed by a third preamble 30, and finally the packet data 32. During the preamble times corresponding to preambles 26, 28, and 30 of packet 25, the synchronization function 14 and channel estimation function 18 of FIG. 1 make estimations of channel frequency offset, phase offset, and channel frequency transfer function, respectively.

FIG. 3 shows one implementation of a prior art packet detection and coarse frequency offset synchronizer such as 14 of FIG. 1. The synchronizer comprises two parts, a coarse frequency offset part 40, and a packet detection part 60. The frequency offset estimator 40 accepts as an input a stream of complex OFDM symbols 92 and a delayed version 42 of the same stream, where the delay is equal to the interval of a single preamble interval 26. The conjugator 52 has the function of inverting the imaginary part of the incoming stream such that a+jb becomes a−jb. The product of (a+jb)(a−jb) produces the signal power level $a^2+b^2$, since the same-position preamble symbols are identical other than the frequency offset generated phase shift component from the earlier symbol to the later symbol. Consequently, the multiplier 44 output contains an imaginary component corresponding to the amount of phase shift from a first preamble symbol to a second preamble symbol. The Phase Finder 46, which is implemented as a CORDIC generates an output 47 which represents the phase φ of the incoming multiplier 44 product. The frequency may be then be estimated from change of phase per sample $\Delta\phi/\Delta t$. The output of CORDIC 46 is averaged 48 to generate a coarse frequency offset 50. This value is measured during the preamble interval and fed back to a numerically controlled oscillator (NCO, not shown) or phase rotator (not shown) to remove any frequency offset during the balance of the packet receive time prior to performing the FFT, where such frequency offset would result in an offset in the FFT 16 of FIG. 1 outputs.

The symbol timing may be extracted from the processing shown as packet detection system 60 of FIG. 3. The incoming stream of baseband OFDM symbols are delayed 62 by a time equal to a preamble interval, and the preamble stream 92 is multiplied 66 by a delayed preamble 63 and conjugated 64 to produce multiplier 66 output 67. This output 67 is averaged over an interval equal to the number of symbols in a preamble (shown as 16 symbols) to generate a value Cn 74, which represents the power level of the signal, as before. During the preamble interval, the multiplication of a current preamble symbol with the same symbol from a previous preamble results in the output 67 of the multiplier 66 representing the correlated signal power. The averager 70 sums the previous preamble values (shown for a 16 symbol preamble) to generate a power value Cn 74 whose value represents the noise plus interference component of the SINR value to be determined. The output 63 of the delay element 62 is multiplied by a conjugate 64 value 65 to produce a product 69, which is averaged over the same preamble interval by averager 72 to generate a signal plus noise power level 76. Since there is very little signal correlation from one symbol of a preamble to the next, the output Pn 76 provides an indication of the uncorrelated noise plus interference level, which includes thermal noise and noise due to interfering sources which is not correlated with one symbol shift, in contrast to the correlated value Cn 74 which indicates the correlated power level of the incoming stream during the preamble interval. Cn 74 and Pn 76 are ordinarily used to establish the symbol timing referenced to the preamble, and one such method is to divide 78 the absolute value of Cn 84 by the noise plus signal level Pn 76 to generate a figure of merit µ 85, and to associate packet detection 90 with µ 85 crossing some predetermined threshold using a comparator 88.

FIG. 4 shows the signals for the prior art packet detection system of FIG. 3. The packet preamble is shown as 120, while signal power 67 is shown as 122 and noise and interference power signal 69 is shown as 124. Output Cn 74 is shown as signal 126, and output Pn 76 is shown as signal 128, which both rise during second preamble time t2, which corresponds to interval 28 of FIG. 2. The ratio of Cn/Pn is shown on waveform 127, and when waveform 127 crosses threshold 125, start of packet 121 is indicated, while end of preamble/start of data/symbol timing may be detected by falling correlated signal waveform 122 edge 123.

The use of existing signals Cn and Pn is known in the prior art for symbol timing and packet detection, and it is also known in the prior art to change demodulation method and transmission speed based on error rate at the detector. It is desired to generate a SINR estimate using these signals for use in demodulation, particularly following the soft constellation demapping step, whereby the quantization method performed on the demapped data may be changed in accordance with the value of SINR as determined during the preamble synchronization step.

An estimate of the receiver signal quality can be used to improve the performance or reduce the complexity of baseband processing functions. An estimate of the noise variance is a sufficient measure of the signal quality, as the AGC (Automatic Gain Control) function of the RF receiver (not shown) ensures constant input power to a base-band system.

Typically, symbol decisions are compared with the received symbol to obtain an error vector. The error vectors can be averaged to obtain an estimate of the noise variance as discussed in U.S. Pat. No. 5,379,324. The symbol decisions can be made at the input to the decoder, or at the decoder output. Using decisions from the output of the decoder provides a better estimate of the noise variance. Both these techniques have significant latency, and it is useful to have an estimate of signal strength established during the preamble interval so that it may be used during the data interval of the same packet. It is desired to have a signal strength estimation for use in an OFDM system which relies on parameters which can be established during the preamble interval.

A technique for synchronization based on a training sequence consisting of repeating patterns is described in "Robust Frequency and Timing Synchronization for OFDM", IEEE Transactions on communications, December 1997. As noted in FIG. 3 and FIG. 4, due to the repeating preamble symbols, a correlation peak is observed at the end of the training sequence. This peak is used to detect a valid reception. The position of the peak also indicates the symbol boundary.

The correlation be represented as, $$C(n) = \sum_{n-L<k\leq n} X(k)*X(k-L)^*$$

The signal energy is computed as, $$E(n) = \frac{1}{2}\sum_{n-2L<k\leq n} |X(k)|^2$$

The normalized value used for symbol timing is given by $$Y(n) = \frac{|C(n)|^2}{E(n)^2}$$

FIG. 6 shows a prior art wireless LAN (WLAN) 602 which includes an access point (AP) 614 and a plurality of stations STA-1 604 through STA-5 612. Each station such as 604 has a related wireless communications link such as 616, and the speed of each link is determined by a negotiation process that includes the station 604 capabilities and quality of link 616. The quality of the link 616 may be dependant on the amount of multi-path interference, or link distance and attenuation, or any number of factors. In the prior art, the link speed 616 is reduced when the link quality is degraded. Each station 606, 608, 610, 612 that is part of the access point 614 may operate at an independent data rate on link 618, 629, 622, 624 within the wireless region 602, and for 802.11a or 802.11g which use Orthogonal Frequency Division Modulation (OFDM) for modulation and demodulation, the available data rates are 6 Mbps, 9 Mbps, 12 Mbps, 18 Mbps, 24 Mbps, 36 Mbps, 48 Mbps and 54 Mbps.

A problem arises when the SINR falls below an acceptable threshold for an outlying station such as Station 3 608, shown operating at the minimum rate of 6 Mbps. Below a critical noise threshold, the error rate for incoming demodulated data to the station will be high. In the wireless LAN protocols, each transmitted packet is explicitly acknowledged by the receiver, and when the acknowledgements are not received by the transmitter, a presumption is made by the sender that the packet was not received, and the packet is retransmitted. Since the transmitter has no knowledge of the SINR at the receiver, and a single bit error results in the retransmission of the entire packet, a problem in low SINR environments is that power resources are consumed in battery powered stations such as STA-3 608 attempting to recover or retransmit data in SINR environments where it is unlikely that an entire message formed from a plurality of packets will be successfully received.

FIG. 7 shows a prior art wireless data stream 700, whereby packets 702, 704, 706, 708 are received for a particular station such as 608 of FIG. 6. An inter-packet gap 710 is present which may be short for back-to-back transmitted packets of a single message, or very long after completion of a current message and prior to the next message.

FIG. 8 shows a prior art wireless receiver for OFDM, which includes an antenna 822, an analog front end 800 performing low noise amplification and mixing from the modulation frequency to baseband, analog to digital converter 804, phase correction 806, and symbol timing detector 808, shown for simplicity as packet detection processing 818. After packet detection is accomplished, the data is Fourier transformed 810, phase equalized 812 to recover the subcarriers of the modulation, demodulated 814, and decoded 816, each step of which is well known to one skilled in the art of wireless OFDM systems.

U.S. Pat. No. 5,214,675 by Mueller et al. describes a system for compensating for multi-path reflection in a communications system by computing a variance of the signal and providing this signal to a filter which compensates for multi-path delay.

U.S. Pat. No. 6,792,055 by Hart describes a system for use in QAM whereby the strength of the demodulated signal is fed back to a gain control. In another embodiment, the decoder makes hard and soft decisions according to a variable threshold which is set by the strength of the signal applied to the decoder.

U.S. Pat. No. 5,740,203 describes a prior art demapper for QAM and PSK modulation methods which performs the function of block 24 of FIG. 1 or block 140 of FIG. 6.

U.S. Pat. No. 5,379,324 by Mueller et al describes a system for computing gain and noise variance of a channel for use in correcting the channel.

OBJECTS OF THE INVENTION

A first object of the invention is the detection of a degraded communications channel by using an SINR estimate derived from a preamble and optionally using also a rate derived from a packet header, and immediately thereafter powering down communications receiver components for a duration of time corresponding to the remainder of the currently received packet.

A second object of the invention is the reduction of power consumption in a battery powered communications device by powering down the receiver for the duration of a current packet when it is determined that the current packet is for a different station.

A third object of the invention is the reduction of power consumption in a battery powered communications device by powering down the receiver for the duration of a current packet when it is determined that the SINR of the current packet in combination with the receive data rate is below a threshold.

A fourth object of the invention is the reduction of power consumption in a battery powered communications device by powering down the receiver for the duration of a current packet when it is determined that the SINR of the preamble is below a threshold.

SUMMARY OF THE INVENTION

An estimate of noise is given by $V(n)=(E(n)-C(n))/L$, measured when the ratio of $En^2/Cn^2$ is at a maximum during a packet interval, where $E(n)$ is derived from the incoming symbol stream 92 $X_k$ where a delay element 62 with a delay interval L equal to a preamble interval generates a delayed incoming stream which is multiplies the incoming symbol stream 92 $X_k$ with the delayed and conjugated copy 65 of the symbol stream to generate a first multiplier 66 output 67 $X(k)*X(k-L)*$. A second multiplier 68 generates an output 69 $X(k)*X(k)*$ from the product of the delayed symbol stream 63 multiplied by a conjugated copy of the delayed symbol stream 65. The complex outputs of the first multiplier 66 are summed over a preamble interval L in accumulator 70, the output of which is fed to phase finder 152 which generates magnitude 156. The magnitude 156 is scaled by the accumulator interval L by scaler 512, and this result is subtracted from the second multiplier 68 output 69 summed 72 over two preamble intervals (2L) and scaled by 2 L, thereby generating an estimate of noise level 162. Qualifier 166 generates signal 168, which indicates when noise estimate 162 is valid, which is optionally at the time when the ratio of $En^2/Cn^2$ is at a maximum.

As discussed earlier, the frequency-offset estimate is computed from the angle of the correlation output $\angle C(n)$ at the peak of $Y(n)$.

The estimate of SINR is used to threshold detect the usability of a communications channel, and if the usability is below a threshold, the communications receiver is powered down through the duration of the current packet. If this usability of the channel is favorably above this threshold, the data communications receiver continues to receive the current packet. The decision to powerdown for the remainder of the packet is made by generating an estimate of SINR from the packet preamble and optionally, the SINR in combination with the data rate provided by the PLCP header. In a second embodiment, the destination address of the packet header is compared to the receiver station address, and if the packet header indicates that the data for the packet is destined for a different station, the receiver removes power from certain components for the duration of the current packet. The reduction of power consumption from removing power when either the packet is not destined for the station receiving it, or because the signal to noise ratio is below a threshold results in extended battery life compared to the prior art.

BRIEF DESCRIPTION OF THE DRAWINGS

FIGS. 5b and 5c show the accumulators of FIG. 5a.

FIG. 9 shows a wireless data stream with powerdown timing.

FIG. 10 shows an SINR dependant powerdown OFDM receiver.

DETAILED DESCRIPTION OF THE INVENTION

Figure 1:
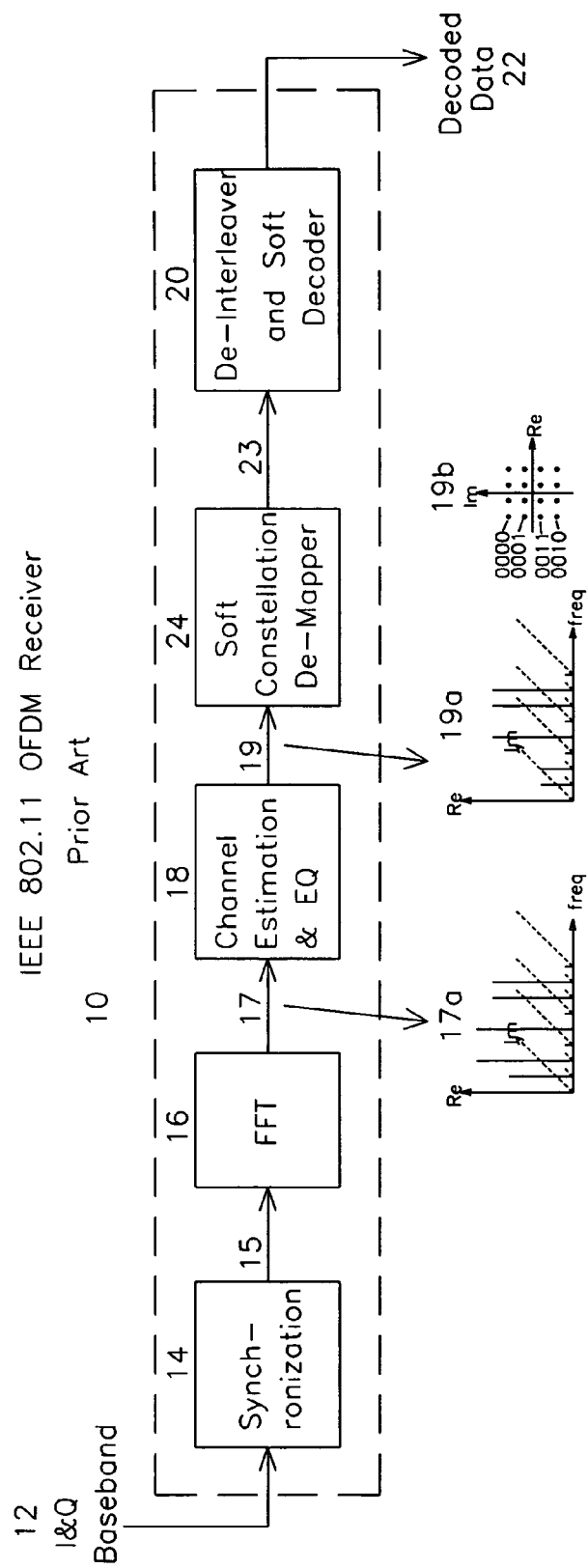
FIG. 1 shows the block diagram for a prior art 802.11 OFDM receiver.
Figure 2:
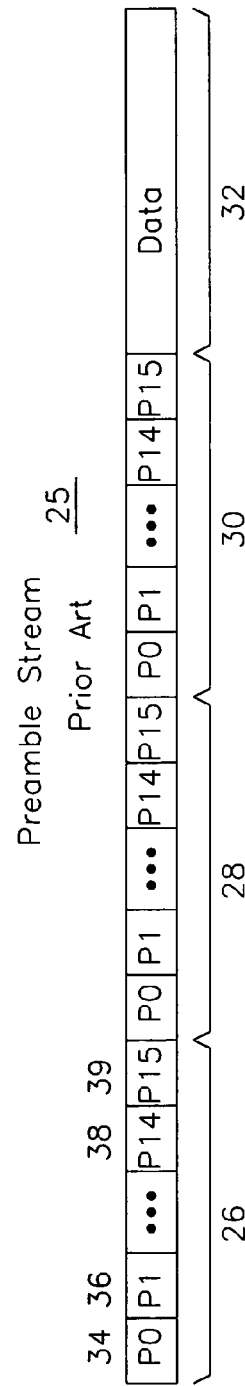
FIG. 2 shows a stream of preamble symbols.
Figure 3:
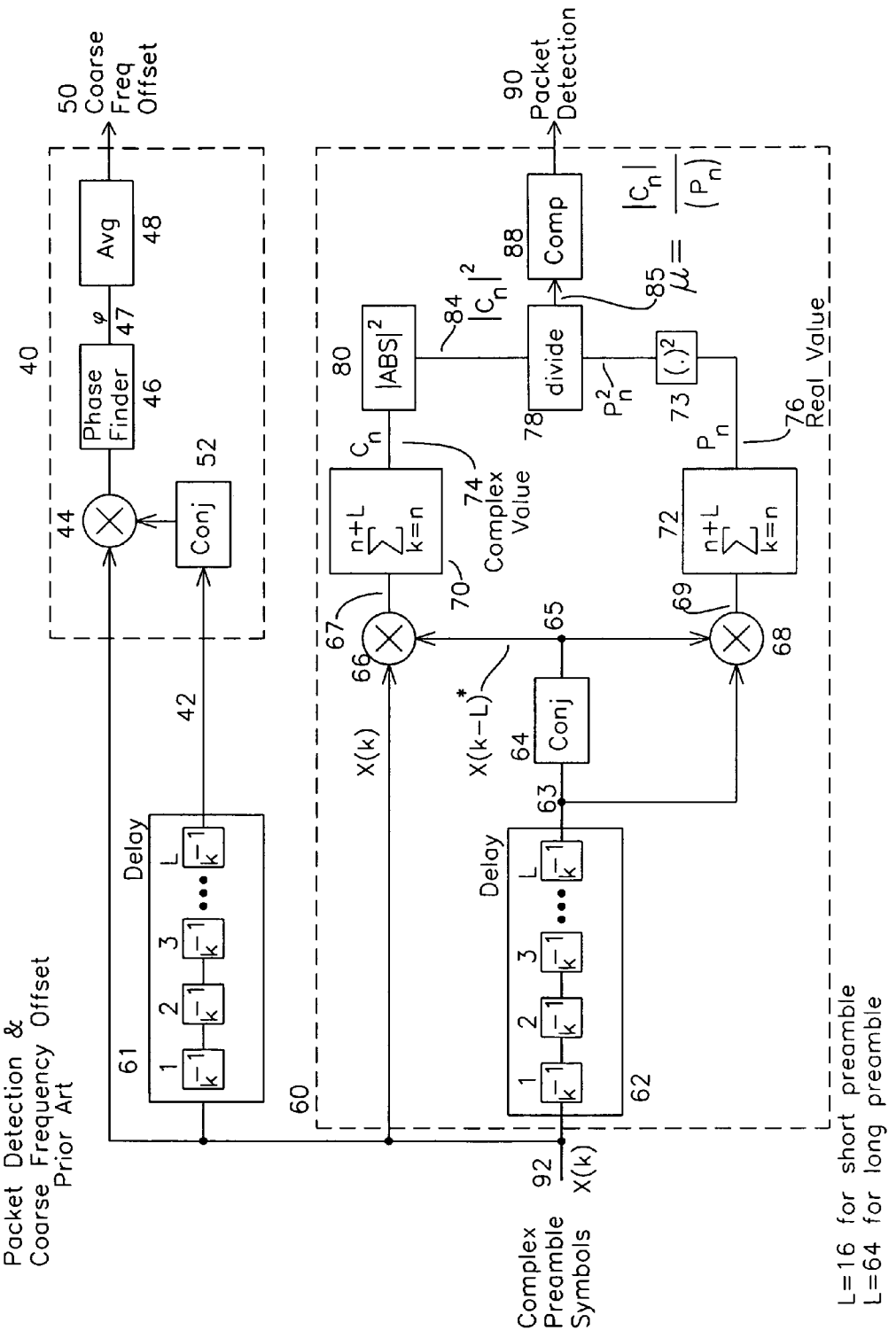
FIG. 3 shows the block diagram for a prior art packet detection and frequency offset subsystem.
Figure 4:
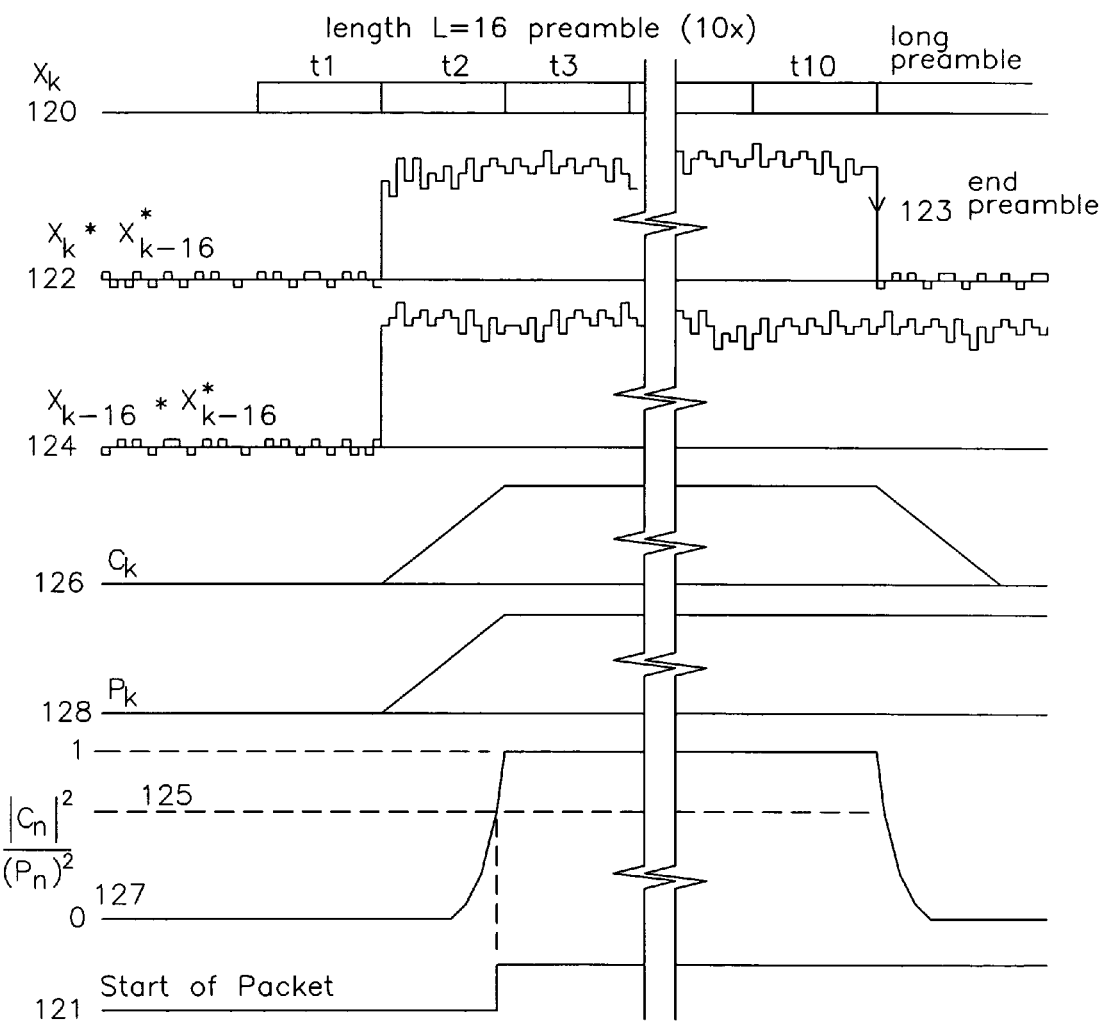
FIG. 4 shows the waveforms of the prior art system of FIG. 3.
Figure 5A:
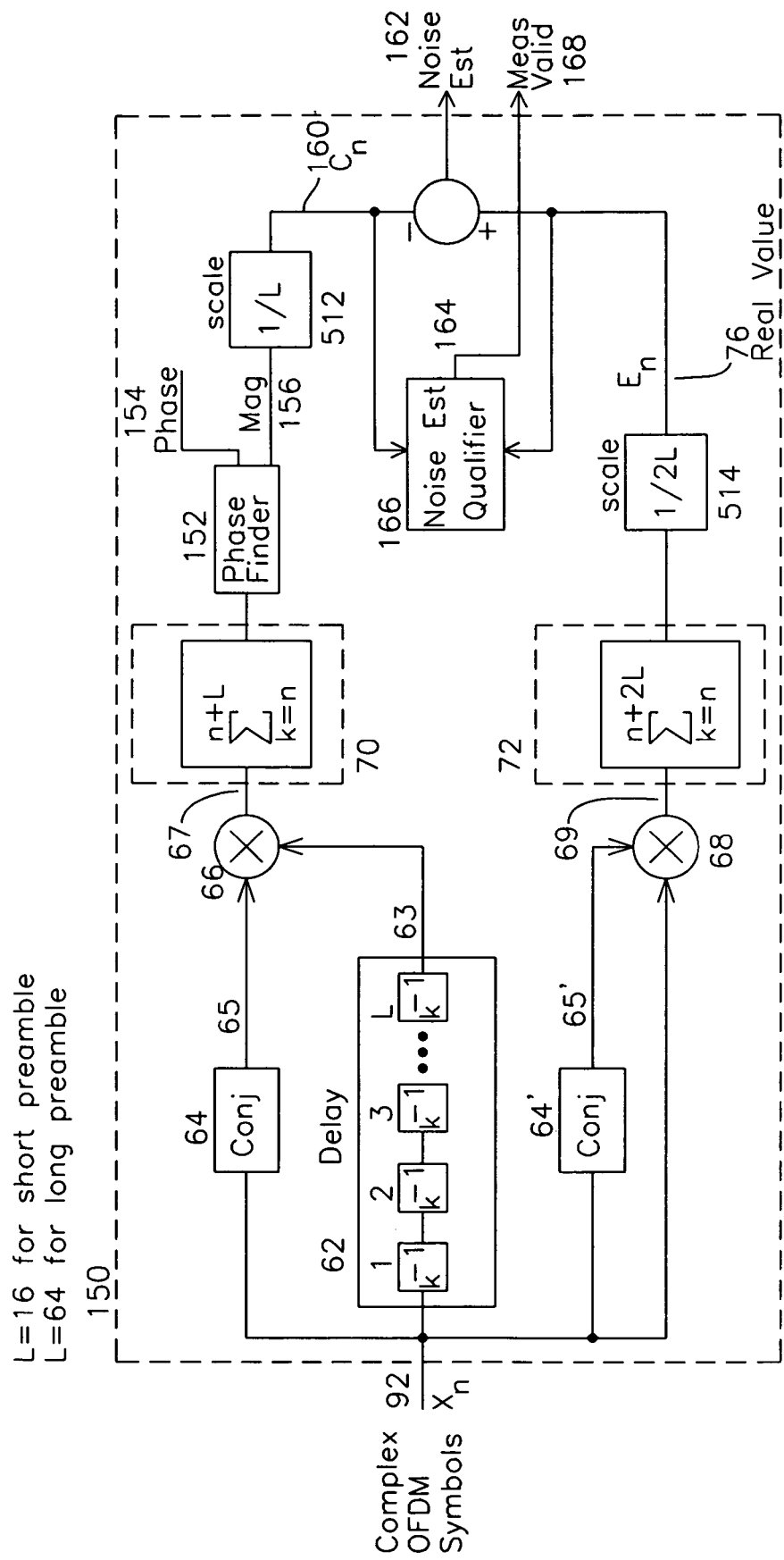
FIG. 5a shows the block diagram for an OFDM noise estimator.

FIG. 5a shows a block diagram for the present noise estimator 150, which may be used as the synchronization function such as 14 of FIG. 1. The synchronization technique shown in FIG. 5a yields a signal quality estimate in the form of noise measurement 162 in conjunction with qualifier signal 168. The reference numbers of FIG. 5a perform similar functions as shown in FIG. 3. As was described earlier, incoming preamble stream 92 is conjugated 64' to generate a conjugated output 65' which is multiplied by second multiplier 68 to second multiplier output 69, which is summed 72 over two preamble intervals 2 L and scaled by 2 L 514 to form real valued En 76. The input signal 92 is simultaneously delayed 62 by preamble length L and multiplied by conjugated 64 multiplied by the input stream 92 using first multiplier 66 to generate output 67 as before, which is accumulated over a preamble interval L in accumulator 70, the output of which is fed to the phase finder CORDIC 152 which provides a phase output 154 as well as a magnitude output 156, which is scaled by preamble interval L to produce Cn 160. An estimate of the noise level 162 can be obtained by subtracting the magnitude of the correlation output $|C(n)|$ 160 from the signal energy $E(n)$ 76 when $Y(n)$ reaches its peak value. In the prior art of FIG. 3, deriving the magnitude of $C(n)$ from $C(n)^2$ 84 would require a square root computation. However, in FIG. 5, the CORDIC processor 152 that is used to compute the angle 154 of $C(n)$ for the frequency offset estimation of FIG. 3 can also compute the magnitude of $C(n)$ 156. The CORDIC processor 152, as known in the prior art, accepts a real and imaginary component as input 67 (a+jb), and generates a phase output 154 corresponding to $\tan^{-1}(b/a)$ and a magnitude output corresponding to $\sqrt{a^2+b^2}$. In this manner, a noise estimate $V(n)$ 162 for the incoming signal 92 can be generated by subtracting the correlated signal level 160 from the noise plus interference output 76. Qualifier 166 generates signal 168, which indicates when noise estimate 162 is valid, which is optionally at the time when the ratio of $En^2/Cn^2$ is at a maximum. An AGC function in the RF processing is performed prior to processor 130, and results in increasing the receiver gain when the incoming signal level is weak, and decreasing the receiver gain when the incoming signal level is strong, thereby optimizing the use of the digitization dynamic range. The AGC function generates a relatively constant En level 76, which results in an improved noise estimate 162. It is also possible to scale the noise estimate 162 by the length of the preamble, shown as L=16 for a short preamble, and L=32 for a long preamble. Generally, a longer sample size produces more accurate estimates of noise variance. In this manner, an improved estimator for noise level for use in a communications receiver is described.

Figure 5C:
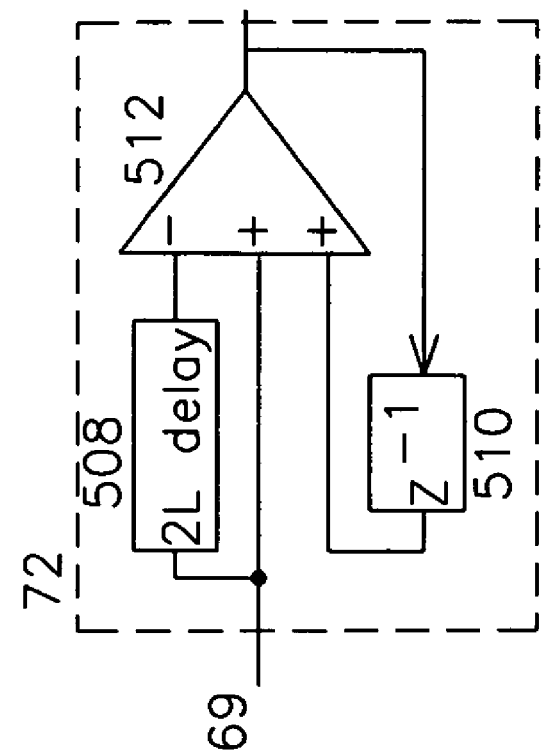
Figure 5B:
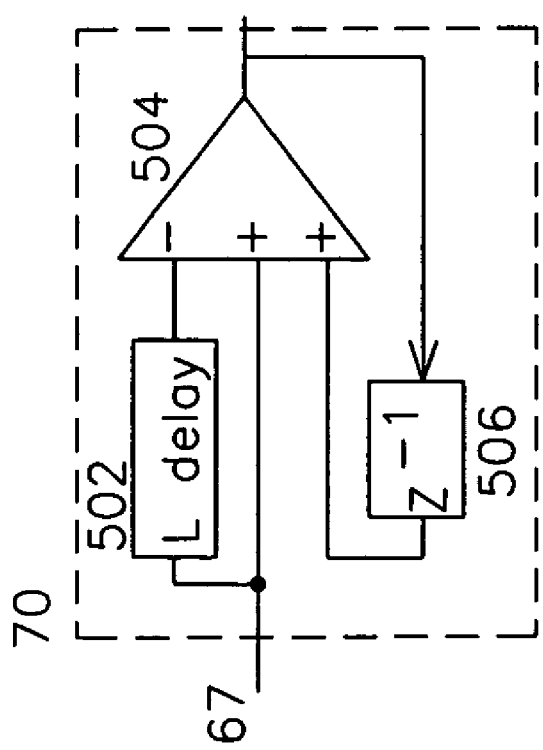

FIG. 5b shows an embodiment for accumulator 70, which takes an input 67 and sums 504 the input 67 with a one-sample delayed output 506 and subtracts out an L delayed 502 version of the input 67. In this manner, the output of the first accumulator represents the sum of the current sample and previous L−1 samples.

FIG. 5c similarly shows an embodiment for the accumulator 72, which receives an input 69 and sums 512 the input 69 with a one-sample delayed output 510 and subtracts out a 2 L delayed 508 version of the input 69. In this manner, the output of the second accumulator represents the sum of the previous 2 L samples.

Figure 6:
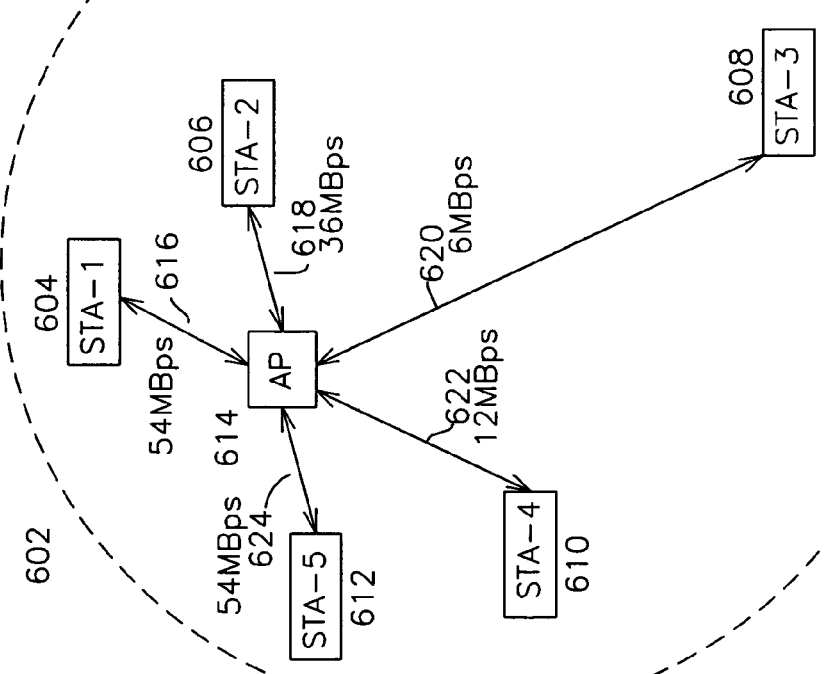
FIG. 6 shows a prior art WLAN comprising an access point with a plurality of stations.
Figure 7:
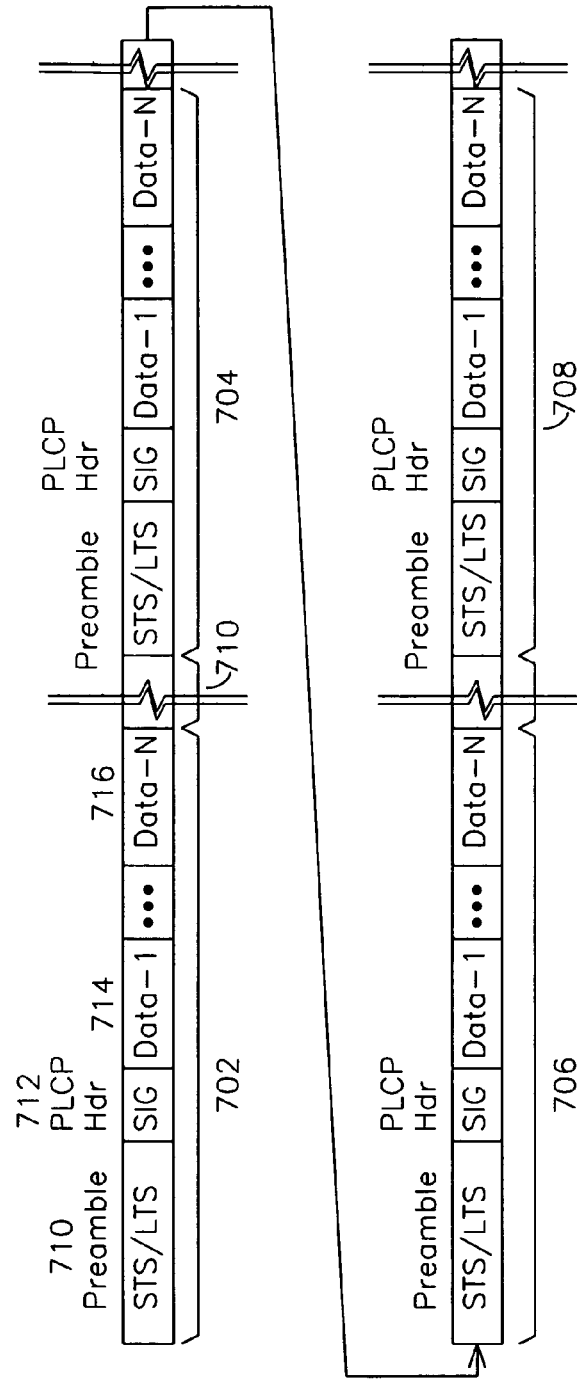
FIG. 7 shows a prior art wireless data stream.

FIG. 9 shows a wireless data stream processed in accordance with the present invention. As was shown in FIG. 7, a stream 900 of wireless data packets is processed, where each packet comprises a preamble 902, which may be used to estimate SINR as described earlier, and this preamble is followed by a PLCP header 904, which indicates the data rate of the following data 906 through 908 and header 904 also contains the destination address for the packet, shown as STA-3 for the headers 904 and 912 for the first two packets, and STA-1 and STA-2, respectively, for the next two packets. The duration from the end of the header to the end of the current packet Tpd 916 may be determined from examination of the packet length field of the header 904, optionally accompanied by the data rate from the header 904. According to one embodiment of the present invention, if the receiving station is STA-3 and the SINR from preamble 902 is determined to be below a first threshold determined by SINR and optionally the data rate from the header 904, the entire receiver processing, or any part of the receiver which is suitable for power down, is powered down for the duration of the packet data Tpd 916, and it is powered back up before arrival of the preamble 910 for the subsequent packet. In another embodiment, if the SINR of the preamble 904 is below a first threshold, the powerdown interval may include data duration 916 as well as header 904 duration. In another embodiment, if receiving stations STA-3 receives packet containing a packet to discard, such as one with a destination address STA-1 in header 918 or STA-2 in header 922, the powerdown interval may be performed during data duration 920 and 924, respectively. The advantage of turning off the receiver electronics during these intervals is that the power otherwise consumed unsuccessfully attempting to decode a packet with very low SINR, or on a packet destined for a different station is saved, and the powerdown decision can be made on a packet by packet basis until the receiver 608 of FIG. 6 is moved closer to the access point 614, or the communications channel 620 improves, or headers associated with packets for the current receiver are detected. For example, if 50% of the data part of the incoming stream (Data-1 . . . Data-N) is associated with incoming packets which are either destined for other stations, or have insufficient SINR at the received data rate for successful demodulation, or in other words if Tpd represents ½ of the useable incoming traffic for this station, then powering down the receiver during the remainder of the packet containing non-useful data will yield approximately a 2× improvement in battery life.

Figure 8:
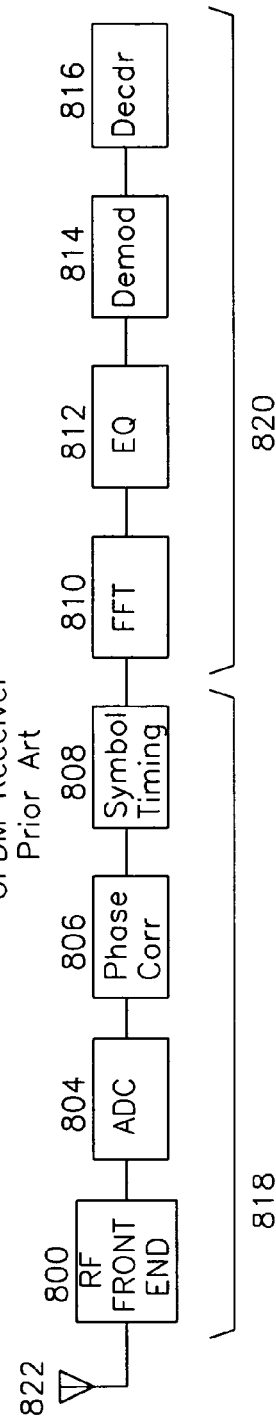
FIG. 8 shows a prior art OFDM receiver.

FIG. 10 shows the SINR-dependant power save OFDM receiver according to the present invention. The processing occurs as was shown in FIG. 8, including analog RF front end 1000, analog to digital converter 1004, and phase correction 1006. The symbol timing block 1008 performs symbol timing, and also generates an estimate of SINR as was described earlier. In a first embodiment, the SINR from the preamble is examined alone to determine if it is above a first threshold, such as 0 db, or any other level which is suitable. If the SINR is below a first threshold, the receiver is placed in a powerdown state for the duration Tpd 916. In a second embodiment, if the SINR of the preamble is sufficient to continue, the Rate and Packet Length information are recovered from the packet header such as 912 of FIG. 9, which determines the powerdown interval such as 926. The Rate and SINR information are compared with a second threshold to determine whether to powerdown the system or any large power consumption parts of the system for the duration Tpd 926 of the current packet after recovery of the rate & length from the header 912. In a third embodiment, if the preamble SINR is sufficient to continue, and the preamble SINR combined with rate and packet length is sufficient to continue, the first field of data 928 is examined, as this contains the destination address for the packet. If the destination address is not for the current station STA-3, as shown in data 928 for STA-1 and 930 STA-2, the receiver is powered down for the duration of the current packet, as shown by Tpd 920 and Tpd 924, respectively.

FIG. 10 shows powerdown signal 1020 distributed to each of the blocks before and after symbol timing 1008, as required. The powerdown function may be accomplished in any manner which reduces the power while allowing a processing function recovery on powerup sufficient for the preamble processing to resume in time for the following packet. Among the power down options that are available is stopping the system clock for those processing functions, which is effective in CMOS digital circuitry such as functions timing 1008, FFT 1010, phase equalization 1010, or demodulator and decoder 1014 and 1016, since most of the power dissipation for these processing functions is related to displacement current losses from clock and data conductor switching. Alternatively the powerdown may be accomplished by significantly slowing down the clock rate, or by removing power altogether from any processing functions which have a large standing current draw irrespective of clock, such as analog amplifier 1000, mixer 1002, or ADC 1004. In the first embodiment, the powerdown signal 1020 is asserted when the preamble SINR is below a first threshold such as 0 db. In the second embodiment, the powerdown signal 1020 is asserted when the SINR is below a second threshold determined by the SINR from the preamble of the packet and data rate and length from the header of the packet. In a third embodiment, the powerdown signal 1020 is asserted when the header destination address does not include the instant receiver station address. For all embodiments, the powerdown signal 1020 is asserted for the remaining duration of the current packet known as a data duration, as determined from the length and optionally rate information from the packet header. The three embodiments may be combined or used separately to control the powerdown signal 1020, and the powerdown signal 1020 may control any parameter of a processing function which reduces or eliminates the power consumption of that processing function.

Figure 11:
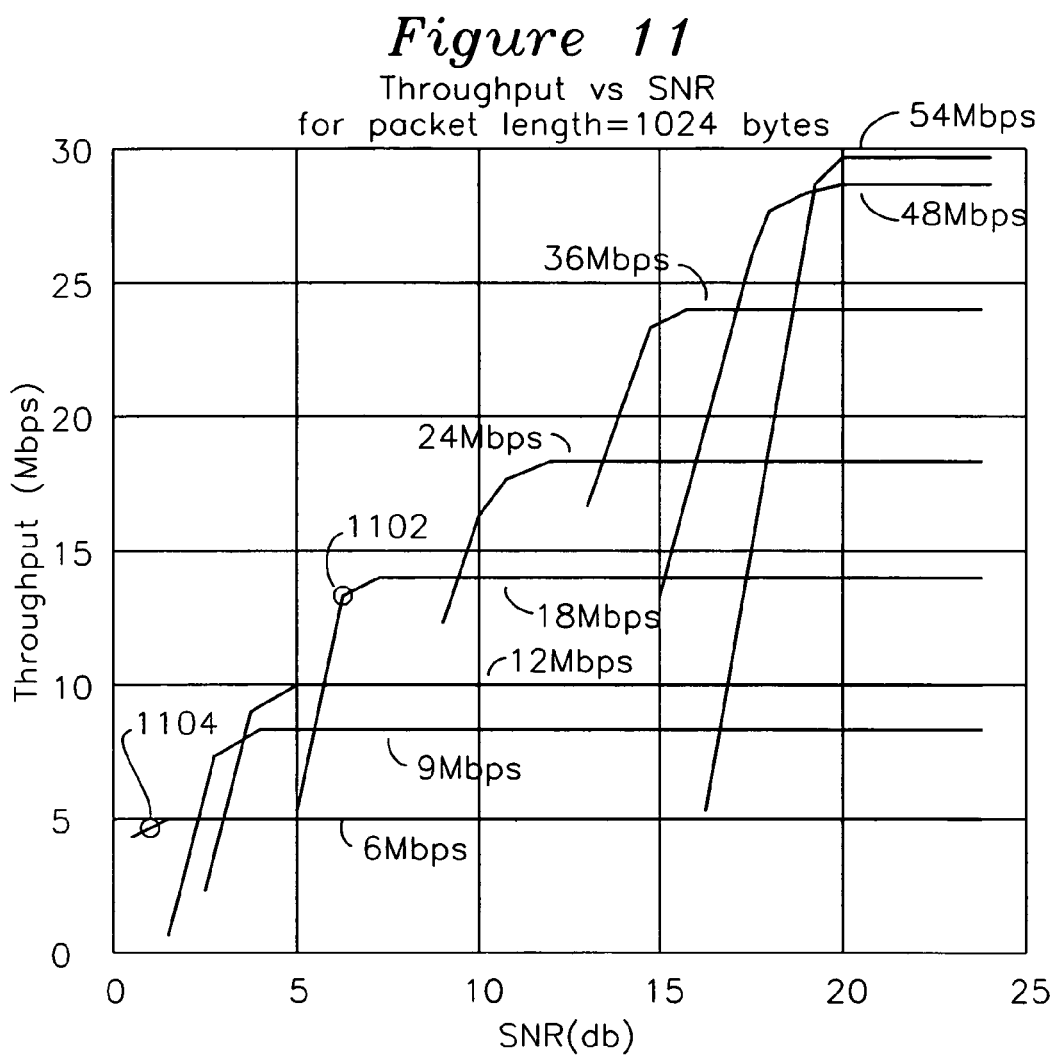
FIG. 11 shows a plot of data throughput vs. SNR for a variety of data rates.

FIG. 11 shows plots of theoretical throughput vs. SNR for a variety of data rates for a packet length of 1024 bytes. A family of such curves must be derived for different packet lengths, resulting in length-dependent threshold values. For example, if the receiver detects from the preamble of a packet an incoming data rate of 6 Mbps, and the SINR is below 2 db of point 1104, or alternatively, if the incoming data rate is 24 Mbps and the SINR is below 6 db of point 1102, corresponding to the cross over point of 12 Mbps and 18 Mbps, the powerdown signal 1020 of FIG. 10 is asserted to save power during the duration of the present packet, and is unasserted in time for receipt of the next packet. While the exact thresholds may be empirically or theoretically determined and may even depend upon other characteristics of the received signal such as the profile of the multipath channel, it can be seen from FIG. 11 that suitable thresholds for powerdown related to SINR and rate are less than 3 dB for 6 Mbps, 5.5 dB for 9 Mbps, less than 6 db for 12 Mbps, less than 9 db for 18 Mbps, less than 13 db for 24 Mbps, less than 17 db for 36 Mbps, less than 20 db for 48 Mbps and less than 24 db for 54 Mbps.

Figure 12:
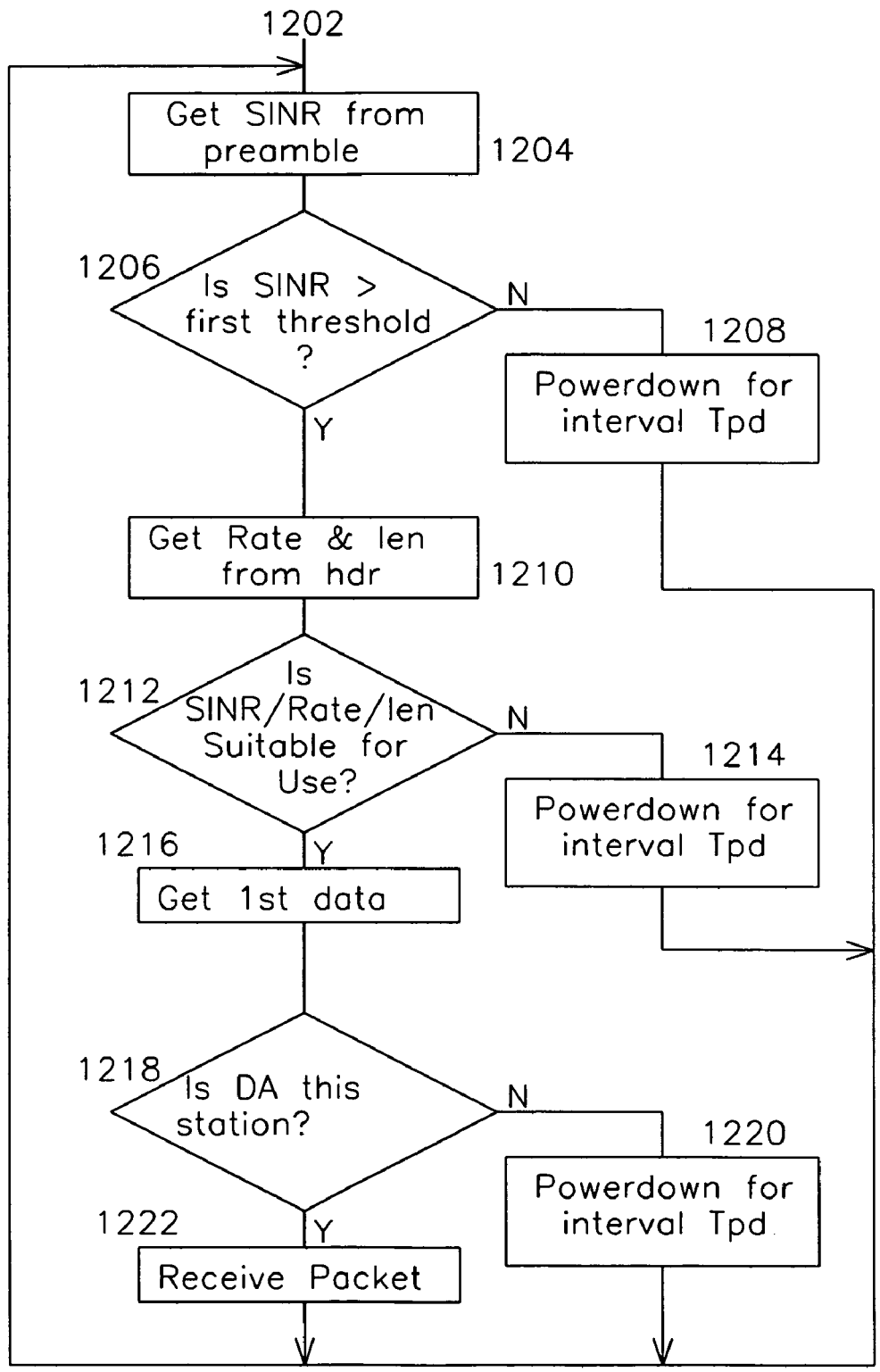
FIG. 12 shows an algorithm for deciding on a packet by packet basis when to powerdown a receiver.

FIG. 12 shows a process for powerdown, whereby at entry 1202 the process waits until the preamble is received, and in step 1204, the SINR is estimated as described earlier, after which the length and rate are recovered from the header as described earlier. In step 1206, the SINR is compared to a first threshold, such as 0 db or any other rate which is suitable to determine that the SINR is too low to successfully receive the packet. If the SINR is below this threshold, the receiver is powered down in step 1208 for the duration of the packet. In step 1210, the rate and optionally packet length are compared 1212 against a second threshold which may be determined from FIG. 11 for the received packet length, or any other metric which predicts the likelihood of correct packet reception. If the SINR is below this second threshold, the receive electronics are powered down in step 1214 for the remainder of the data in the current packet, such that the receiver is ready to receive the preamble of the next packet. If the SINR is above the second threshold 1212, the first data 1216 which contains the destination address of the packet is received and compared 1218 against the destination address of the present station. If the destination address is for a different station, the receiver is powered down for the remainder of the packet in step 1220, otherwise the packet is received 1222 and processed as in the prior art. In this manner, an improved wireless receiver is described.

Figure 13:
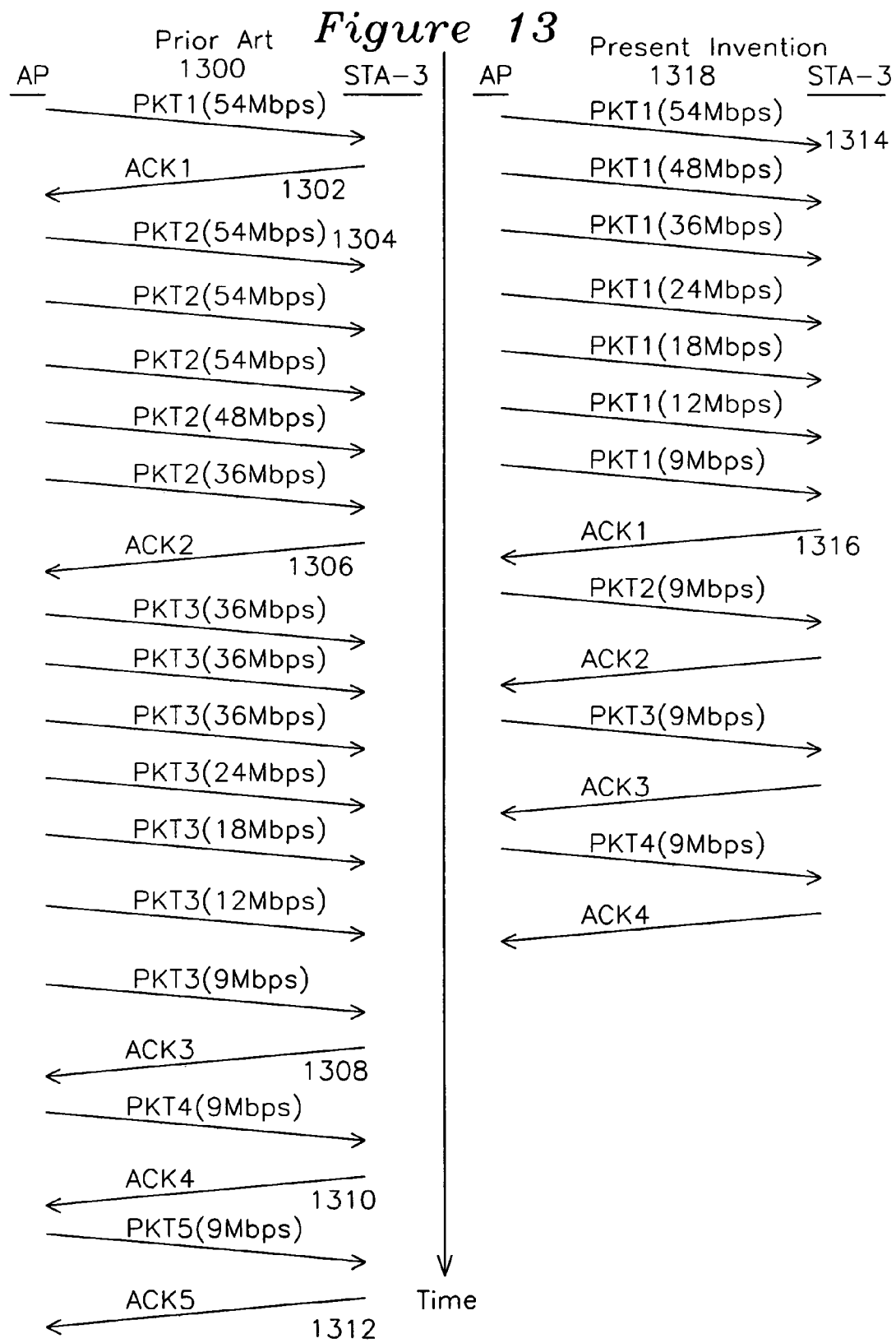
FIG. 13 shows a packet exchange diagram for the prior art and current invention.

FIG. 13 shows that, in addition to the power saved by powering down the receiver for the duration of an unusable packet as described in the present invention, the data rate convergence to an acceptable rate occurs at a faster rate, and with a reduced consumption of channel bandwidth through the retransmission of data at rates not supported by the SINR. Prior art sequence 1300 shows a first packet (PKT1) transmitted at 54 Mbps and acknowledged 1302, which incorrectly confirms to the AP that 54 Mbps is an acceptable rate for this station. Thereafter packet 2 (PKT2) is unsuccessfully transmitted, and after a few retries, the AP reduces the rate until the second packet PKT2 is acknowledged 1306. The transmissions resume and PKT3 is not acknowledged until the rate drops to a reliable rate (for the SINR of this station) of 9 Mbps and error free reception is acknowledged in packets 1308, 1310, 1312. 1318 shows the same packet exchange according to the present invention, which the inventors call "virtual SINR feedback". In this exchange, the receiving station does not acknowledge packets until the rate is dropped to an acceptable level of 9 Mbps, and the first packet is acknowledged 1316, after which all packets are acknowledged. As can be seen in comparison to the prior art exchange of 1300, the number of retransmissions is reduced, and the data rate convergence occurs much faster, and the number of retransmissions is reduced, thereby consuming less channel resource.

We claim:

1. A receiver for receiving a plurality of packets, said packet having, in sequence, a preamble having a preamble duration, a header having a header duration, and a plurality of data having a data duration, said receiver including processing functions, at least one said processing function having a powerdown state for reduced power consumption and an operational state capable of said processing function;
   said receiver including a noise estimator processing function which makes a noise estimate from said preamble during said preamble duration by subtracting an energy component from a noise component;
   said at least one said processing function entering said powerdown state for said header duration plus said data duration when said noise estimate of said preamble is below a first threshold.

2. The receiver of claim 1 where said first threshold is from 0 to 3 db.

3. The receiver of claim 1 where said powerdown state includes removing a clock source from at least one said processing functions.

4. The receiver of claim 1 where said powerdown state includes removing power from at least one of said processing functions.

5. The receiver of claim 1 where said processing functions include at least an analog section including a baseband mixer, an analog to digital converter, a phase corrector, or a symbol timing function.

6. The receiver of claim 1 where said processing functions include at least a Fast Fourier Transform (FFT), a phase equalizer, a demodulator or a decoder.

7. The receiver of claim 1 where said energy component is formed by multiplying the symbols of said preamble by delayed and conjugated said symbols of said preamble to form symbol energy products and summing said symbol energy products over an interval.

8. The receiver of claim 1 where said noise component is formed by multiplying the symbols of said preamble by conjugated said symbols to form symbol noise products and summing said symbol noise products over an interval.

9. A receiver for receiving a plurality of packets, each said packet having, in sequence, a preamble having a preamble duration, a header having a header duration, and a plurality of data having a data duration, said receiver having a plurality of processing functions, each processing function having a powerdown state for reduced power consumption and an operational state whereby it is capable of said processing function;
   said receiver including a noise estimator which makes a noise estimate from said preamble during said preamble duration and determines a data rate from said header during said header duration;
   said receiver entering said powerdown state for said header duration plus said data duration when said noise estimate in combination with said data rate is below a data rate dependent threshold.

10. The receiver of claim 9 where said data rate dependent threshold is less than 3 dB for 6 Mbps, less than 5.5 dB for 9 Mbps, less than 6 db for 12 Mbps, less than 9 db for 18 Mbps, less than 13 db for 24 Mbps, less than 17 db for 36 Mbps, less than 20 db for 48 Mbps and less than 24 db for 54 Mbps.

11. The receiver of claim 9 where said packet is an 802.11a or 802.11g packet.

12. The receiver of claim 9 where said data rate from said header includes a rate which is at least one of 6 Mbps, 9 Mbps, 12 Mbps, 18 Mbps, 24 Mbps, 48 Mbps, or 54 Mbps.

13. The receiver of claim 9 where said powerdown state includes removing a clock source from at least one said processing functions.

14. The receiver of claim 9 where said powerdown state includes removing power from at least one of said processing functions.

15. The receiver of claim 9 where said processing functions include at least an analog amplifier including a down-converter, an analog to digital converter, a phase corrector, or a symbol timing function.

16. The receiver of claim 9 where said processing functions include at least a Fast Fourier Transform (FFT), a phase equalizer, a demodulator or a decoder.

17. The receiver of claim 9 where said noise estimator subtracts an energy component from a noise component.

18. The receiver of claim 17 where said energy component is formed by multiplying the symbols of said preamble by delayed and conjugated said symbols of said preamble to form symbol energy products and summing said symbol energy products over an interval.

19. The receiver of claim 17 where said noise component is formed by multiplying the symbols of said preamble by conjugated said symbols to form a symbol noise product and summing said symbol noise products over an interval.

20. A receiver for receiving a plurality of packets, each said packet having, in sequence, a preamble having a preamble duration, a header having a header duration, and a plurality of data having a data duration, said receiver having a plurality of processing functions, each processing function having a powerdown state for reduced power consumption and an operational state whereby it is capable of said processing function;

said receiver including a noise estimator which makes a noise estimate from said preamble by subtracting an energy component from a noise component during said preamble duration and determines a data rate from said header during said header duration;

said receiver having a receiver address and said data including a destination address;

said receiver entering said powerdown state during said data duration after comparing said receiver address to said destination address when said destination address does not include said receiver address.

* * * * *